United States Patent
Koohmarey

(10) Patent No.: US 10,650,597 B2
(45) Date of Patent: May 12, 2020

(54) AUGMENTED REALITY ASSISTANT

(71) Applicant: ServiceNow, Inc., Santa Clara, CA (US)

(72) Inventor: Darius Koohmarey, Poway, CA (US)

(73) Assignee: ServiceNow, Inc., Santa Clara, CA (US)

( * ) Notice: Subject to any disclaimer, the term of this patent is extended or adjusted under 35 U.S.C. 154(b) by 188 days.

(21) Appl. No.: 15/889,964

(22) Filed: Feb. 6, 2018

(65) Prior Publication Data
US 2019/0244425 A1 Aug. 8, 2019

(51) Int. Cl.
G06K 9/00 (2006.01)
G06T 19/00 (2011.01)
G06Q 30/00 (2012.01)
H04L 29/08 (2006.01)
H04L 29/06 (2006.01)
H04W 4/02 (2018.01)
H04N 5/00 (2011.01)
H04W 4/70 (2018.01)

(52) U.S. Cl.
CPC ........ *G06T 19/006* (2013.01); *G06K 9/00221* (2013.01); *G06Q 30/016* (2013.01); *H04L 67/12* (2013.01); *H04L 67/125* (2013.01); *H04L 67/18* (2013.01); *H04L 67/38* (2013.01); *H04N 5/00* (2013.01); *H04W 4/02* (2013.01); *G06T 2215/16* (2013.01); *H04W 4/70* (2018.02)

(58) Field of Classification Search
CPC ..... G06T 19/006; H04L 67/125; H04L 67/38; H04L 67/18; H04L 67/12; H04W 4/02; H04W 4/70; G06K 9/00221; G06Q 30/016

See application file for complete search history.

(56) References Cited

U.S. PATENT DOCUMENTS

| 6,421,571 | B1 * | 7/2002 | Spriggs | G05B 15/02 345/629 |
|---|---|---|---|---|
| 2005/0216421 | A1 * | 9/2005 | Barry | G06F 11/0709 705/64 |
| 2013/0031202 | A1 * | 1/2013 | Mick | G06Q 10/06 709/217 |
| 2015/0382208 | A1 * | 12/2015 | Elliott | G06F 16/245 370/252 |
| 2015/0382212 | A1 * | 12/2015 | Elliott | H04W 76/10 370/252 |

(Continued)

Primary Examiner — Samir A Ahmed
(74) Attorney, Agent, or Firm — Fletcher Yoder PC

(57) ABSTRACT

An augmented reality AR device may be communicatively connected to a remote network management platform configured to support a managed network. The AR device may capture an image of a real object in the field of view of an imaging component of the AR device. The real object may be recognized as a known managed object of the managed network. The AR device may also concurrently determine context information indicating a location or physical environment. The AR device may then transmit an identifier of the known managed object and the context information in a message to the management platform. In response, the AR device may receive data associated with the known managed. The AR device may then display a virtual object in a virtual space superimposed on the captured image of the real object, where the virtual object and the virtual space are based on the received management data.

20 Claims, 13 Drawing Sheets

(56) References Cited

U.S. PATENT DOCUMENTS

| | | | |
|---|---|---|---|
| 2016/0087851 A1* | 3/2016 | Hugenberg, III | G06F 16/2358 709/224 |
| 2016/0203569 A1* | 7/2016 | Forbes, Jr. | G06Q 50/06 717/105 |
| 2016/0328885 A1* | 11/2016 | Soon-Shiong | G06T 19/006 |
| 2017/0004652 A1* | 1/2017 | Koga | H04N 7/183 |
| 2017/0048337 A1* | 2/2017 | Fraccaroli | H04L 67/18 |
| 2017/0161958 A1* | 6/2017 | Eilat | G02B 27/017 |
| 2018/0150810 A1* | 5/2018 | Lee | G06Q 20/102 |

* cited by examiner

US 10,650,597 B2

AUGMENTED REALITY ASSISTANT

BACKGROUND

In an enterprise network, customer support personnel may be responsible for fielding problem reports and undertaking actions to resolve reported problems. As an enterprise grows and employs more and remotely managed networks that include more and more devices and services, management of reported problems can become challenging. The potential volume and complexity of problems may call for an organized system for managing reported problems and customer (end user) expectations. An added challenge to management is the variety of contexts and operational environments from within which personnel may need to discover, report, and resolve issues. These may include receiving calls or reports at remote management offices, visiting management infrastructure sites, and staffing physical walk-up helpdesk sites, among others.

SUMMARY

It is now common for enterprise networks to include tens of thousands of devices across dozens of networks, supporting thousands of users. Enterprise networks may be deployed as remotely managed networks, in which many aspects of the actual underlying network architecture, as well as network operations, are managed offsite by a third party. The operational missions of remote network management may thus entail multiple aspects, including asset tracking and management, network health and performance, monitoring of functional systems and servers, and customer support for the users of the system working at end-user stations (devices) in the network, to name a few examples. Asset tracking and management may involve recording and tracking asset physical locations, functional locations, repairs states and histories, and personnel to whom assets may be assigned (e.g., for end-user devices), for example. Network health and performance may involve problem and/or event detection and isolation of network infrastructure (e.g., routers, switches, gateways, etc.), traffic monitoring, and security alerts, for example. Monitoring of functional systems may involve performance tracking of application servers, database servers, and other service delivery/transaction computing devices, load balancing among servers, and deployment configuration/reconfiguration, for instance. And customer support may entail support personnel fielding problems reported by end users, and undertaking actions to get the problems resolved, among other customer support management (CSM) tasks and functions. Note that in the context of remotely managed networks, "customers" may be end users who themselves provide support services for the enterprise network, such as sales, inventory, order fulfillment, database management, or external-customer service.

These (and possibly other) operational aspects of remote network management may involve and/or rely partly on various types and categories of data stored in the remotely managed network and accessed as needed in the course of carrying out management tasks. For example, data for asset tracking and management may take the form of database records that include information such as asset (e.g., device) identification, device types, known or assigned locations, open and resolved repair issues, and assigned personnel. Data for network health and performance may take the form of logical and physical network maps, identification of individual infrastructure components (e.g., component types/functions, operational/repair states, etc.), service alerts or events, and time series data representing network performance (e.g., traffic, utilization, congestion points, etc.). Data for monitoring of functional systems could be include information similar to that for network health and performance, but applied or relevant application servers, database servers and the like. And data for CSM tasks and functions could include user profiles (e.g., user identifications, job descriptions, preferences, issue history, etc.), device and hardware assignments, system support dependencies, and open and resolved issues.

For the various operational aspects of remote network management, effective and successful delivery of remote management services depends, in part, on fast and efficient access to the data. This, in turn, entails not only data retrieval, but the ability to quickly and accurately identify relevant data. In typical circumstances, the initial steps involved identification of appropriate data are carried out by support personnel through one or another form of manual input of information at a user interface. For example, manual entry of asset tag information could be an initial step in asset management relating to a particular piece of equipment. Similarly, manual entry of a router or switch identifier might be a step in trouble-shooting a network or server issue. In the realm of CSM, the approach of using walk-up help desks or kiosks can involve CSM personnel manually entering user information of walk-up customers.

In addition, various management tasks may entail interpretation and/or evaluation of management data and network performance metrics, alerts, and status. These types of user interaction with data may also involve manual steps such as keyboard entry of queries, and searching through lists, among others. Data may also include knowledge stored in a knowledge management system, which, when accessed conventionally, needs to be manually searched through keyboard entry of queries that a user must identify.

The inventor has recognized that manual entry of information used in various tasks and functions of remote network or customer support management, including the example aspects described above, can pose a hurdle to initiating management operations and/or delivery of services. The inventor has also recognized that manual interaction with data across disparate systems and databases can be inefficient. The inventor has further recognized that entry of information by support personnel, as well as interaction with management data, can be largely or entirely automated by incorporating augmented reality (AR) into the user interface that supports both input of, and interaction with, management data and operations. Accordingly, example embodiments are disclosed herein for AR-based assistants in remote network and customer service management.

Accordingly, a first example embodiment may involve a computer-implemented method carried out by an augmented reality (AR) device communicatively connected to a remote network management platform configured to support a managed network, the method comprising: capturing an image of a real object in a field of view (FOV) of an imaging component of the AR device; in real time with capturing the image, recognizing the real object in the captured image as a known managed object of the managed network; in real time with capturing the image, determining context information indicative of at least one of a location of the AR device, or a physical environment of the AR device; in real time with capturing the image, transmitting a message to the remote network management platform, the message including both an identifier of the known managed object and the context information; in response to the transmitted message, receiving from the remote management platform management data associated with the known managed object; and in real time with capturing the image, displaying in the display component of the AR device a virtual object in a virtual space superimposed on the captured image of the real object, the virtual object and the virtual space being based on the received management data.

In a second example embodiment may involve a computer-implemented method carried out by an augmented reality (AR) device communicatively connected to a remote network management platform configured to support a managed network, the method comprising: in a display component of the AR device, displaying an image of a real object captured in real time in a field of view (FOV) of an imaging component of the AR device; in real time with displaying the image, receiving from the remote management platform management data associated with a known managed object of the managed network, the known managed object being identified with the real object in the captured image; in real time with displaying the image, displaying in the display component of the AR device a virtual object in a virtual space superimposed on the captured image of the real object, the virtual object and the virtual space being based on the received management data; in real time with displaying the image, receiving user input interacting with the virtual object; and in response to the received user input, initiating a network management operation directed to the real object.

In a third example embodiment may involve a computing system disposed within a remote network management platform and configured to support a managed network, the computing system comprising: one or more processors; memory; and program instructions, stored in the memory, that upon execution by the one or more processors cause the computing system to perform operations including: receiving a message transmitted by a remote augmented reality (AR) device via the managed network, the message including information designating an object recognized in a real-time field of view (FOV) captured by the remote AR device, and context information associated with the recognized object; based on the context information, selecting a category of managed objects of the managed network; associating the recognized object with a particular managed object in a database of managed objects of the selected category; retrieving information associated with the particular object from the database of managed objects of the selected category; and transmitting a reply message to the remote AR device via the managed network, the reply messaging including the retrieved information for display on the remote AR device concurrently with display of the real-time FOV.

In a fourth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
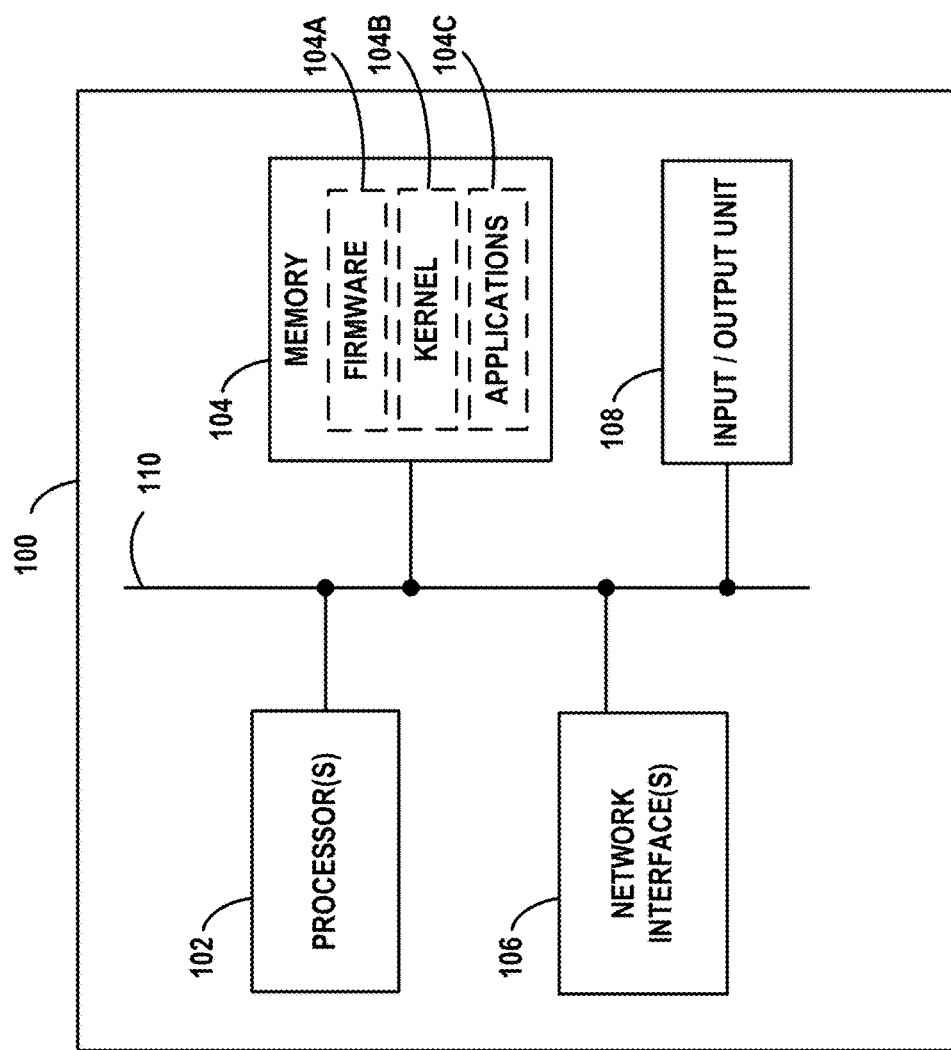
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of solid custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
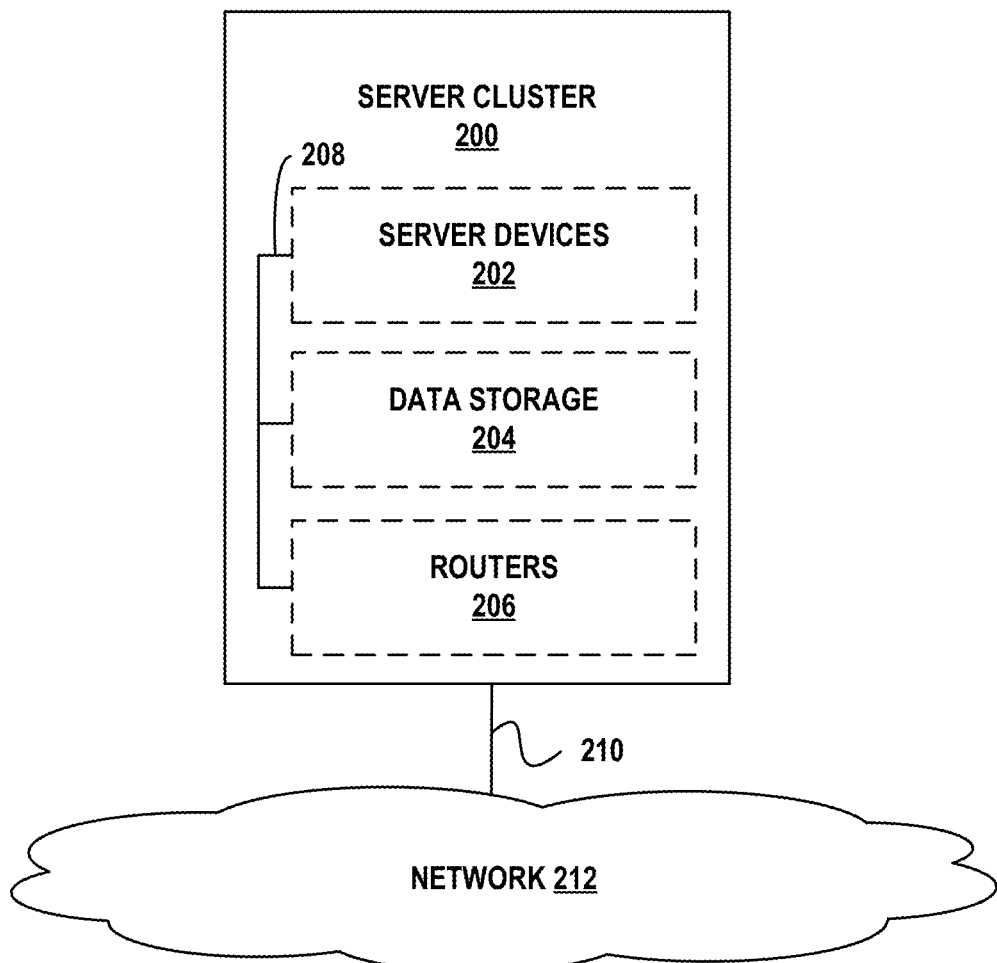
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
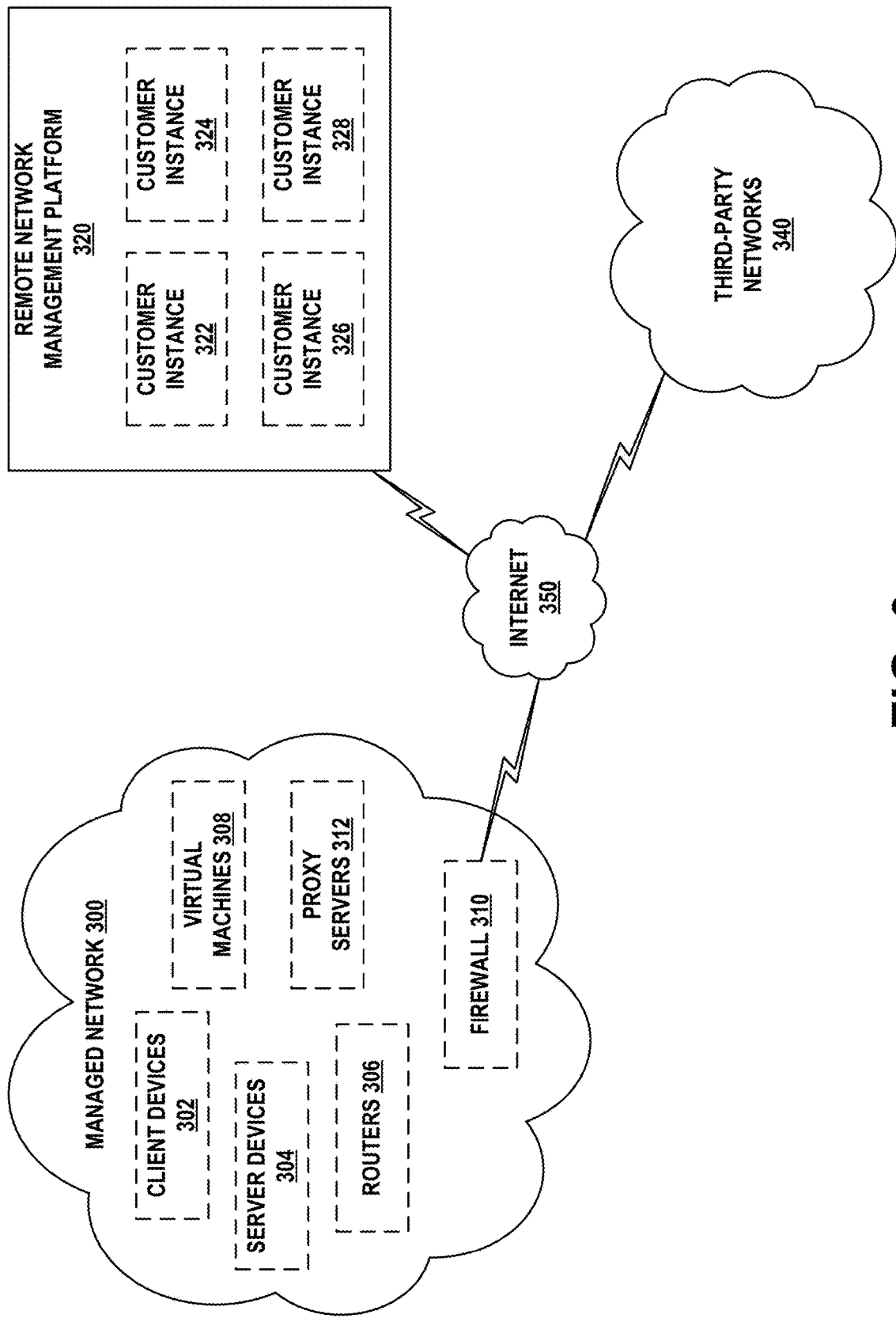
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
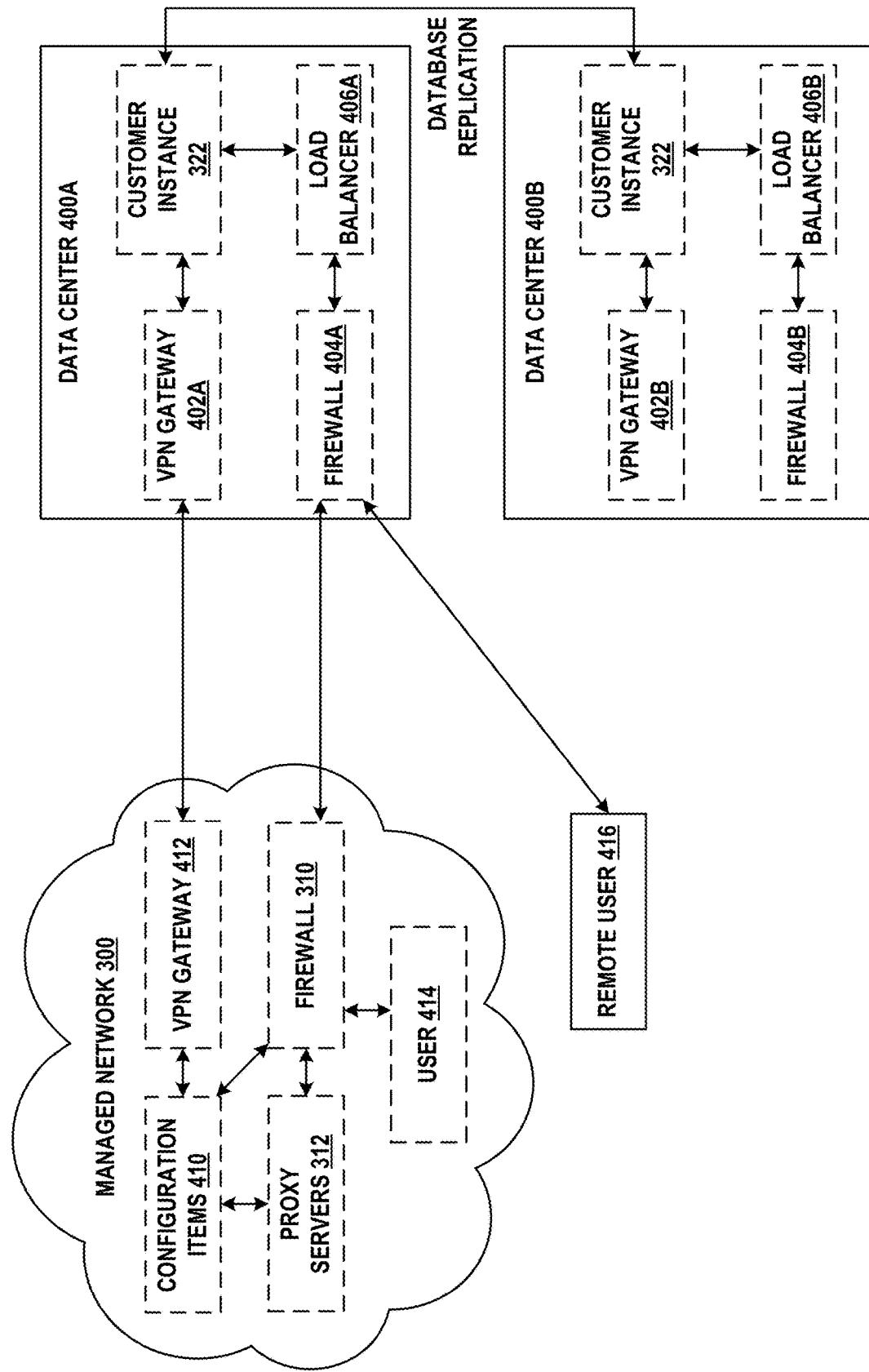
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
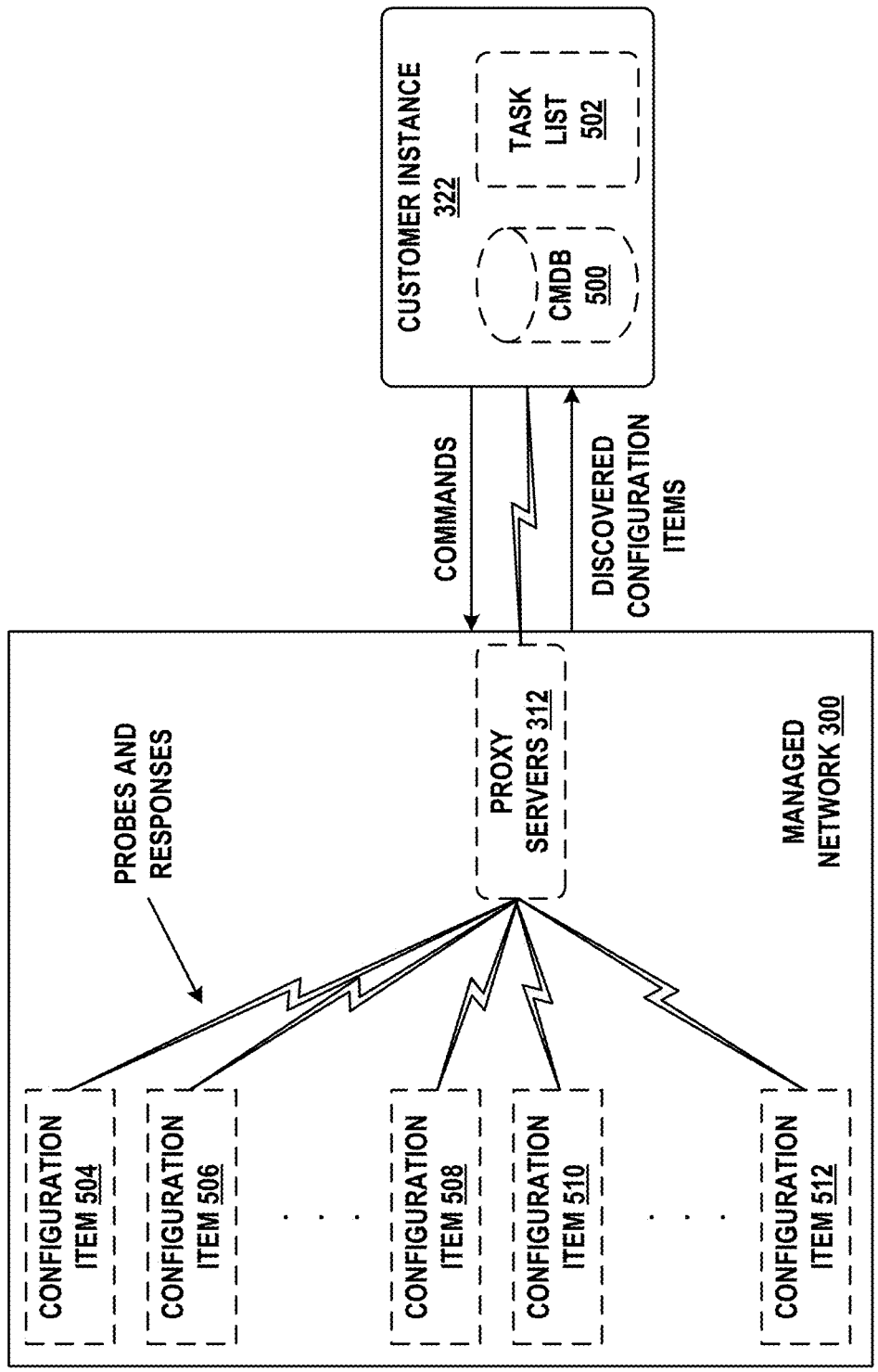
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
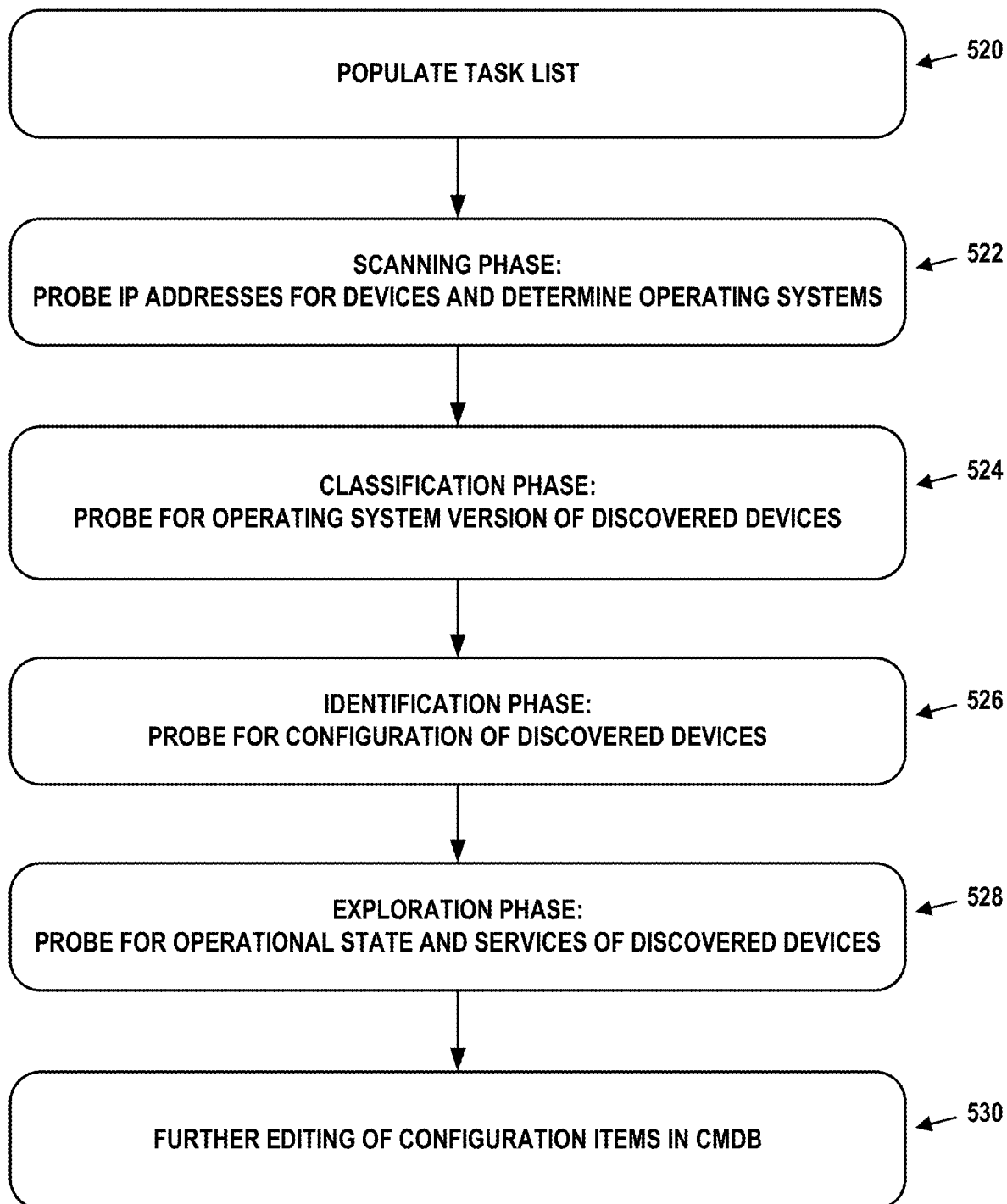
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. AUGMENTED-REALITY-BASED ASSISTANCE AND SUPPORT IN MANAGED NETWORKS

A wide variety of tasks and operations involved in management of managed networks, such as ones described by way of example above, are carried out by support personnel who directly interact with devices and components of the managed network and/or with end-users of the managed network. In their support roles, these personnel may need to enter data and information relating to a managed object (including devices and customers), which data may often or typically already be stored somewhere in the remote network management platform or customer instance, or elsewhere in a connected database, for example. Non-limiting examples of such data and information could include customer profiles, open service issues (e.g., "tickets"), device descriptions, device status, device locations with network topologies, and user assignments of devices, to name a few.

Support personnel may also need analyze, evaluate, or carry out management operations on data and information about or associated with managed objects, or with portions or subsystems of the managed network itself. In the context of network management, analysis and evaluation may involve some form of interaction with output data and information. Non-limiting examples of such interaction-based analysis and evaluation could include fault isolation within a subnetwork, assessment of device or subsystem reconfiguration, knowledge base content searching, and data/command selection from an application interface, to name a few.

In accordance with example embodiments, both types of interactions—broadly described above as input of data and information, and interaction with data and information—may be significantly aided and/or made more efficient and efficacious by an augmented-reality-based user interface. More particularly, an AR-based user interface, which may be implemented on a variety of end-user devices, may include functional components for automatic input of data through real-time interaction with, and recognition of, real objects. For example, an AR device may include an imaging component, such as a digital still and/or video camera, for capturing an image of one or more real objects in a field of view (FOV) of the imaging component. As another example, an AR device could include an audio input component, such as a microphone, for detecting audio input, such as spoken voice commands or other recognizable sounds. The AR device could also include a display component, such as LED or other pixel-based display hardware (and supporting driver functionality). A display component could display images captured by the imaging component, as well as synthetically-generated images of virtual objects. Non-limiting virtual objects could include text, generated still or moving images, or holograms.

In addition to the components for display, and components for capture of images, audio, or other inputs, an AR device may also include components and/or capabilities to process and recognize specific content in audio and/or visual (e.g. image) input. For example, audio input may be processed in order to recognize voice commands or other spoken content. And image input (e.g., captured digital image input) could be processed in order to recognize specific real objects of captured images. Examples of such visual recognition could include recognition of human faces, device types or identification tags, and physical environments (e.g., particular rooms, buildings, or other physical structures). These and other forms of recognition of content in captured input could be carried out by one or more application programs of the AR device itself, or could be achieved by a server or service of a network to which the AR device is communicatively connected. Recognition functionality could also be carried out partly by the AR device and partly by a server or service in the connected network.

In accordance with example embodiments, recognition of content captured by sensor components, such as the above example visual input component or audio input component, can be used determine one or more network management operations associated with the recognized content. More particularly, recognized content can be used to cause automatic input of management data and to initiate an associated management task or operation, either in the AR device, in the managed network, or both. For example a recognized device identification tag could be supplied to a remote management platform in the form of transmitted message. A management program in the remote management platform could respond by sending the AR device management data relating to the identified device. Such data could include device status, connected devices, or open issues, for example. The AR device could then display (in the display component) device information rendered as a virtual object (e.g., text) superimposed on that of the image of the real object (device). The communication between the AR device and the remote management platform could thus automate an input operation that starts with image capture.

Similarly, image capture of a person's face could initiate an input CSM operation. For example, facial recognition by the AR device (possibly with assistance of a server or service in the connected network) and communicated to a remote management platform could invoke a CSM application program in the remote management platform, which in turn could provide a user profile and other management information related to the person whose face was recognized. The CSM information provided in this way to the AR device could be displayed as virtual object superimposed on the image of the recognized person. Again, recognition of a customer could initiate automated input of user data and execution of a CSM operation related to the recognized person, without the support personnel having to manually enter information at the AR device These are just two examples of automated input of management data and initiation of related management operations. In accordance with example embodiments, an AR device can also support user interaction with virtual objects that are superimposed on a display component. For example, the AR device could recognize hand gesture of a user (e.g., network management support personnel) interacting with displayed text or a displayed network map. The gesture could select a displayed object in virtual space, and a related command or operation could then be invoked. In this way, a management command or operation could be selected by a user pointing to a displayed word in the AR device display, for example. Such operations could be to create an issue or a change against a given device on the map. Similarly, the status of a network link could be queried by a user pointing to a link in a virtual display of a network map. This mode of interaction with one or more virtual objects in the display of an AR device could thus simplify the user interface to management tasks and operations.

A. Example AR Devices

Augmented reality capabilities are becoming generally available from third parties in the form of application programs that may be implemented on smart phones and other similarly equipped devices, as well as AR-specific devices that integrate AR hardware and application programs out of the box. These applications and devices may include user and/or developer programmable features that can be fashioned to meet specific functional needs and requirements. Examples of such applications for tablets and/or smartphones include Facebook™ AR Studio, Apple™ AR Kit, Google™ Tango, as well as numerous open source software platforms. Examples of wearable AR-capable head-mounted devices include Microsoft™ Hololense and Google™ Glass. In the context of the present disclosure, AR applications and devices such as the identified examples may serve as programmable platforms for implementing and carrying out the various functions and tasks described herein by way of example.

The two general and non-limiting example descriptions herein of AR devices as either smart devices (e.g., smartphones and tablets) to which AR applications are added, or integrated (native) AR devices, can also be characterized as either being wearable devices or non-wearable devices. An example of a wearable device is a head-mounted device. Such a device may include a display component that overlays or superimposes a displayed image on a FOV of the "real world" that appears in front of a user who is wearing the device. In such an arrangement, a "real object" that is captured and recognized by an image capture component may not necessarily also be rendered in the display component, but rather may simply be viewed directly by the user. On the other hand, in a non-wearable device, such as a smartphone or tablet, the image of the "real object" may be actively displayed in the display component in order to show what the imaging component has captured. It will be appreciated that these operational distinctions are not limiting with respect to the disclosed operations and functions relating to AR-based assistance in the context of network management and disclosed herein.

It should also be understood that the operations and functions described herein as being carried out on an AR device are not limited to any particular AR device, either of those examples listed above, or otherwise. Rather, it is assumed that the operations and functions in accordance with example embodiments can be implemented on any AR device that includes hardware and/or programmable (e.g., software, firmware, etc.) support for those operations and functions. As described above, for example, an AR device may include a display component, an image capture component, an audio/acoustic capture component, and capability—either native or assisted by an external device—to carryout image (e.g., facial) recognition and speech recognition. In addition, an AR device may include one or more communication interfaces for communicating with devices, servers, and services in the managed network and/or other networks. Further, and AR device may include one or more user interfaces, such as a keypad, or other input device or component.

B. Example Use Cases

In accordance with example embodiments, AR capabilities of an AR device (including programmed platforms and integrated AR devices) may be particularly adapted for support and delivery of a variety of tasks, functions, and operation of remote network management. Some examples of these operations have been described briefly above. In the following discussion, a few specific example uses cases of AR-based assistance and an AR-based assistant used in example network management settings are described.

Caller Detection.

This sample use case is applicable to customer service management, and thus to AR-based assistance to CSM personnel. In an example, a customer's face may be recognized by an AR device being used by a CSM support technician, for example. Upon recognition and communication of the customer identity to a remote management platform, the AR device receives in reply.

Figure 6A:
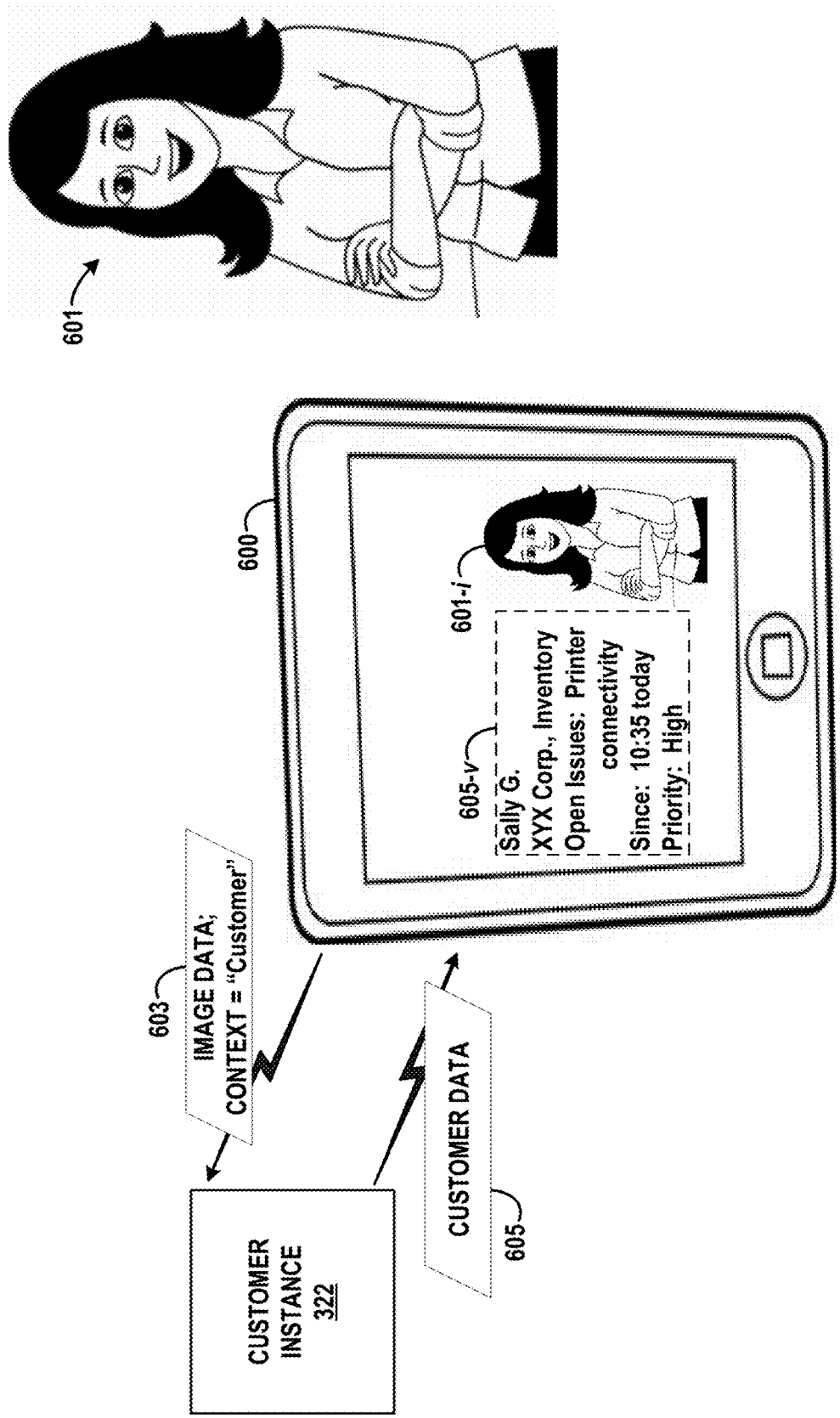
FIG. 6A is a conceptual illustration of example operation augmented reality assistance in a remote network management architecture, in accordance with example embodiments.

FIG. 6A is a conceptual illustration of certain aspects of this example use case for a non-wearable AR device. In the figure, a tablet AR device 600 views a customer 601, who is the "real object" in this example. An image of the customer 601-*i* is displayed in a display component of the AR device 600. The AR device 600 recognizes the customer, possibly with the assistance of a server or service in a connected network, and transmits a message 603 to the customer instance 322 in the remote management platform 320. The message includes the image and context information, which, by way of example, specifies "customer." The customer instance 322 may use the context information to determine the appropriate processing of the image data. For instance, the specification of "customer" may cause the processing to look up customer information for the identified customer. The customer instance 322 then responds with a message 605 containing the customer data, which the AR device 600 displays in a virtual image 605-*v*. In the example illustrated, the customer data includes the customer's name, company she works for, her role at the company, open issues, when the issue were reported, and an associated priority. Thus, in this example, a CSM support technician can get all of this information just by capturing the customer's image. No manual data entry needs to be involved.

Figure 6B:
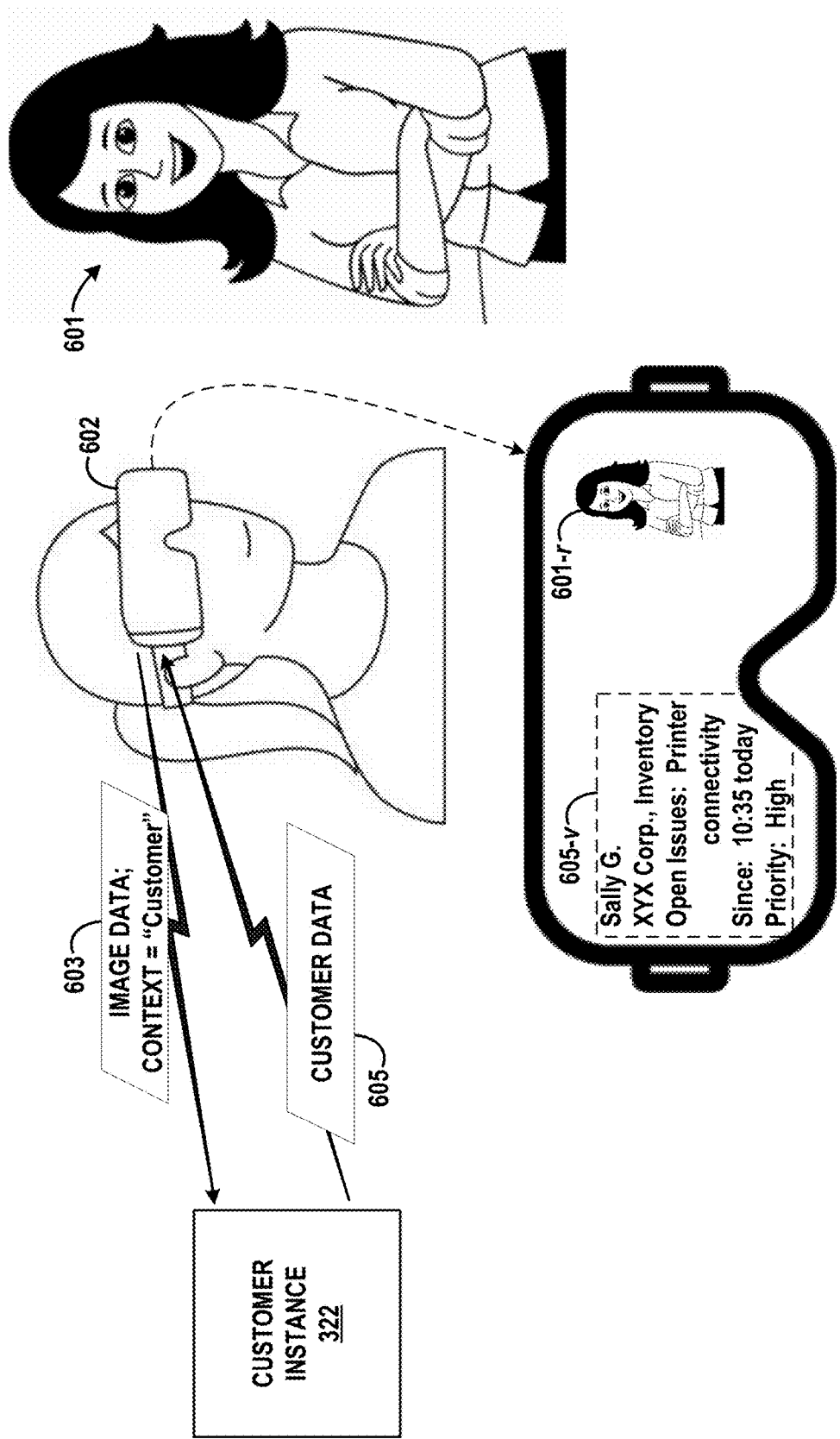
FIG. 6B is another conceptual illustration of example operation augmented reality assistance in a remote network management architecture, in accordance with example embodiments.

FIG. 6B illustrates the same use case as FIG. 6A, but this time the AR device is a wearable head-mounted AR device 602. All of the other aspects of the example illustrated in FIG. 6A are the same in FIG. 6B, except that the display is worn by the CSM support technician. A dashed curved arrow in the figure points to the forward FOV as seen by the user (wearer) of the AR device 602. Also, the image of the real object (i.e., the customer 601) may not be the image that is captured by an image capture component, but rather just what the CSM support technician directly views in her forward FOV. A dashed curved arrow in the figure points to the forward FOV as seen by the user (e.g. CSM support technician) of the AR device 602.

Note that the example of caller detection could apply a customer who makes a video call to a remotely located CSM support technician, or to a walk-up helpdesk or support kiosk.

Assisted Fulfillment.

This sample use case is applicable to IT management and support for network assets, such as end-user devices (laptops, desktops, etc.). In an example, computer vision of an AR device may detect and recognize an asset tag and send a query to a customer instance 322 for relevant information. The support personnel using the AR device can use this mode of device recognition and data entry to create an incident report, change an assigned owner, or associate some other report or request with the recognized device. This approach may also facilitate rapid creation of task records.

Figure 6C:
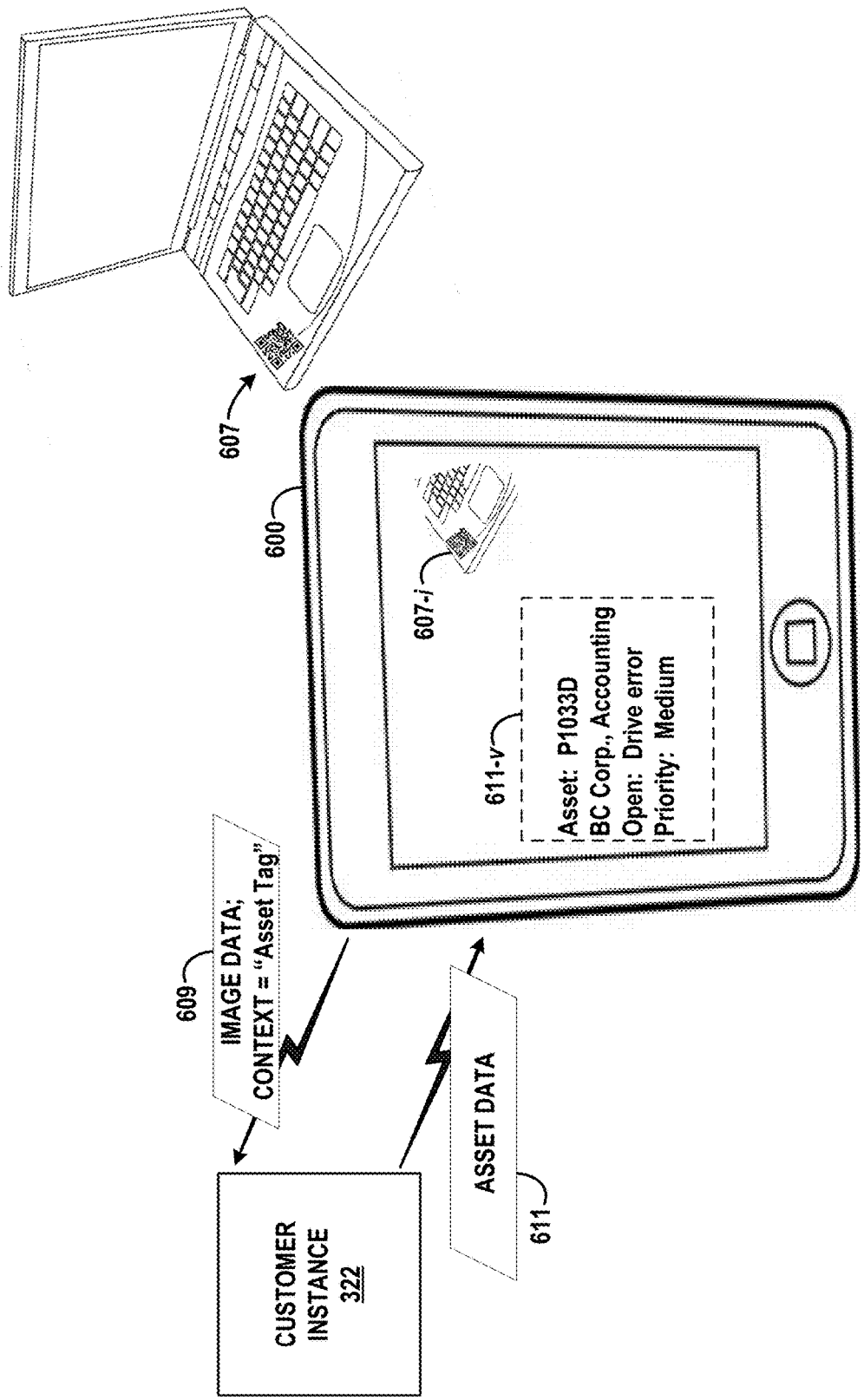
FIG. 6C is still another conceptual illustration of example operation augmented reality assistance in a remote network management architecture, in accordance with example embodiments.

FIG. 6C is a conceptual illustration of certain aspects of this example use case for a non-wearable AR device. In the figure, a tablet AR device 600 views a laptop 607 having an asset tag affixed (e.g., a QR code label). The laptop 607 is the "real object" in this example. An image of the laptop 607-$i$ is displayed in a display component of the AR device 600. The AR device 600 recognizes the asset, possibly with the assistance of a server or service in a connected network, and transmits a message 609 to the customer instance 322 in the remote management platform 320. The message includes the image and context information, which, by way of example, specifies "asset tag." The customer instance 322 may use the context information to determine the appropriate processing of the image data. For instance, the specification of "asset tag" may cause the processing to look up device information for the identified laptop. The customer instance 322 then responds with a message 611 containing the device data, which the AR device 600 displays in a virtual image 611-$v$. In the example illustrated, the device data includes an asset ID, the company that owns the asset, the organization within the company, open issues, and an associated priority. Thus, in this example, an IT technician can get all of this information just by capturing the device's image, including the asset tag. No manual data entry needs to be involved.

Integrated Data Visualization.

In an example of this use case, an AR device may be used to scan or capture an asset tag or other identifying feature of a network device, such as a router, switch, or wireless access point, for instance. In this case, the network device is the "real object." Upon recognition, the AR device may supply the identity of the network device to a remote network management platform, such as platform 320. Further processing may then be carried out by customer instance, such as instance 322, if management information for the identified device is specific to the customer instance. Otherwise, processing may occur at the platform level, if management information for the identified device is more general to more than one customer instance, for example. In responding to the device identification, the remote network management platform may provide the AR device information that the AR device then superimposes on the display of the identified network device.

By way of example, the device information provided by the remote network management platform could be used to generate and display a virtual network map showing the location of the device and the status of connected devices. The displayed information could also include text describing the identified device, its, status, and any open issues, for example. In addition, the AR device could support user interaction with the displayed information. Keeping with the example of a virtual network map, a user may be able to use a hand gesture to query information about a device in the map, or to create issue or change records against an element in the map through touch and voice commands. This example use case could be applicable to information technology (IT) technicians and/or network architects.

Figure 6D:
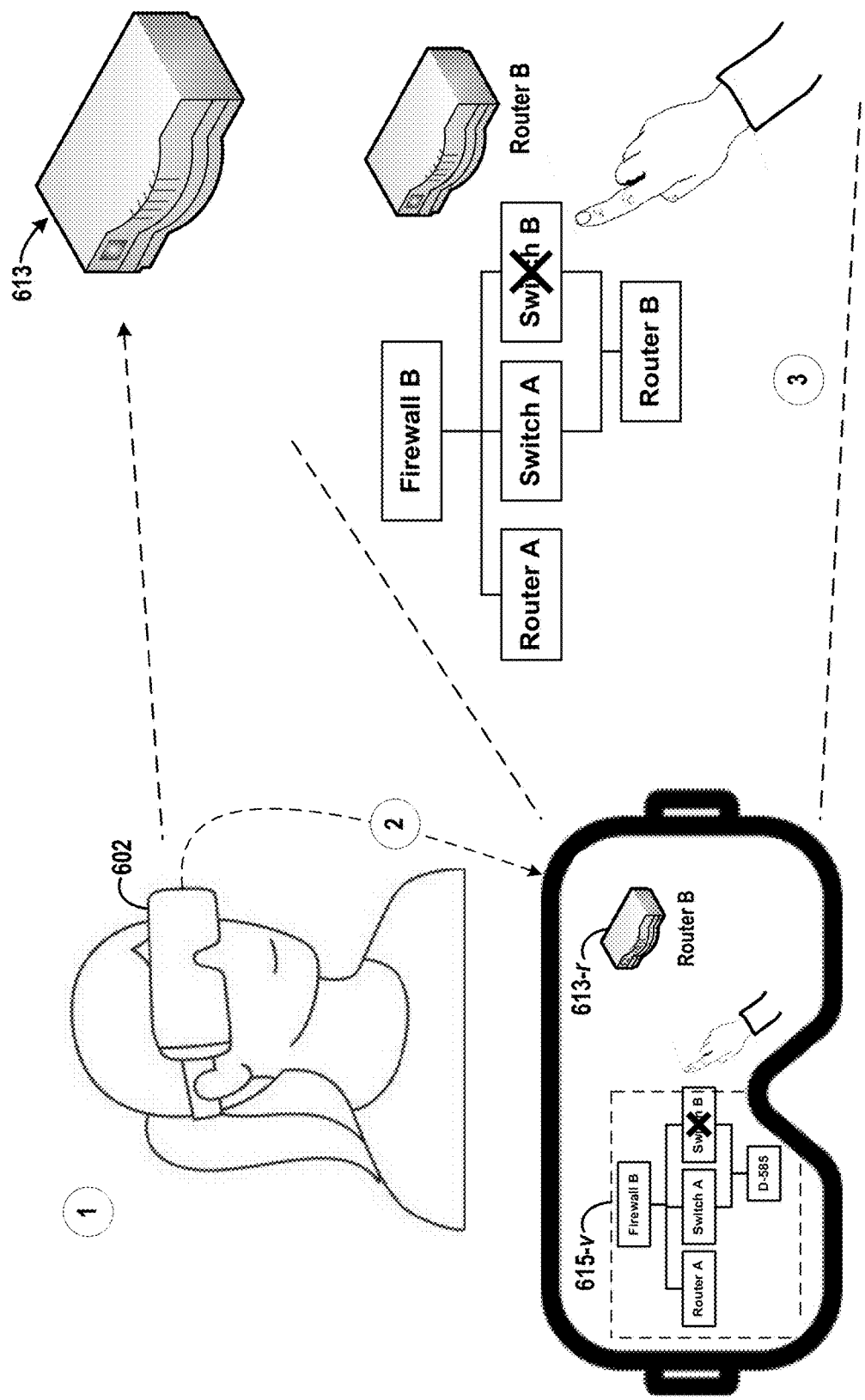
FIG. 6D is still one more conceptual illustration of example operation augmented reality assistance in a remote network management architecture, in accordance with example embodiments.

FIG. 6D is a conceptual illustration of certain aspects of this example use case. In the figure, a user wearing a head-mounted AR device 602 views a device 613. In operational steps not explicitly shown but similar to those in FIGS. 6A, 6B, and 6C, the AR device 602, possibly with assistance of a server or service in a connected network, recognizes the device 613 and communicates this information to the remote network management platform. The remote platform responds with information about the device, including its identity as "Router B" and network map showing the location of Router B, along with "Firewall B," "Router A," "Switch A," and "Switch B."

For convenience in the present discussion, circled numbers 1, 2, and 3 label different general aspects of the illustrated operation. Specifically, number 1 just shows the user looking toward the real device 613. Number 2 show what the user sees through her AR display. Namely, a real object 613-$r$, identified as Router B, and virtual network map, corresponding to the virtual object 615-$v$. Number 3 is a conceptual depiction of what the user sees. Namely the Router B and the virtual map superimpose or "hovering" what appears to the user to be the same space. The user can then gesture to the virtual map to invoke a management action. By way of example in the illustration, the Switch B is marked with an "X," indicating a problem or issue. As shown, the user points to the Switch B, an action which may then initiate or invoke a query to remote management platform for more information about the problem switch. It will be appreciated that other forms of display and interaction are possible as well.

Integrated Knowledge Search.

This sample use case is applicable to IT management and support for trouble-shooting, diagnosing, and configuring network or end user devices. In an example, computer vision of an AR device may detect and recognize a network device, for example by an asset tag or brand and model label. The AR device then sends a query to a customer instance 322 for knowledge base (KB) information about the device. The reply information in this case could include identification of articles about the device and/or about specific issues, instructions, configuration data, etc., relevant to the device. The AR device may display the information, including selectable links to the articles or other KB information returned in the reply. The support personnel using the AR device can select an article by clicking link in the display, issuing a voice command, or selecting a link with a hand gesture, for example.

Figure 6E:
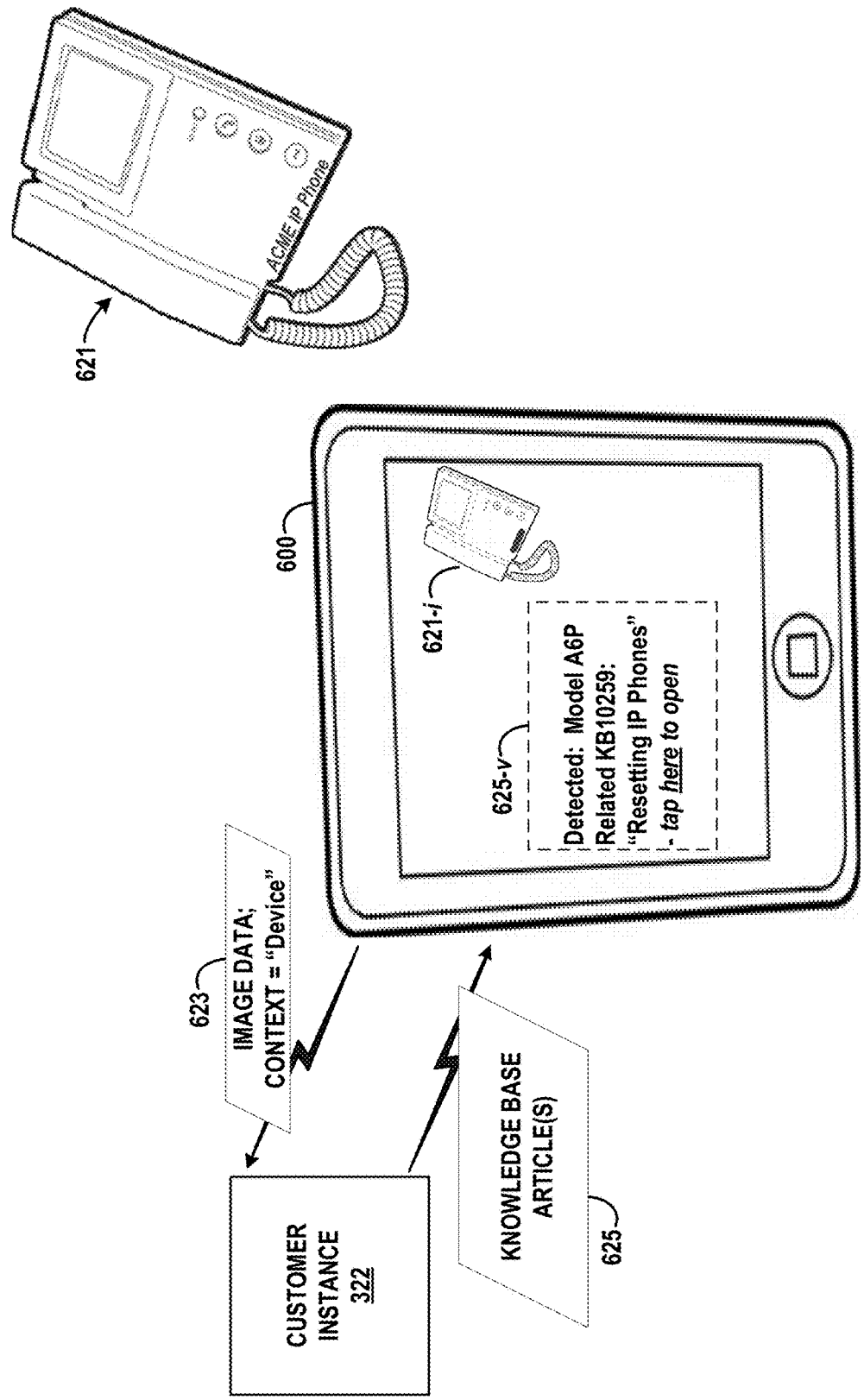
FIG. 6E is yet another conceptual illustration of example operation augmented reality assistance in a remote network management architecture, in accordance with example embodiments.

FIG. 6E is a conceptual illustration of certain aspects of this example use case for a non-wearable AR device. In the figure, a tablet AR device 600 views an IP phone 621 having, by way of example, a brand label. The IP phone 621 is the "real object" in this example. An image of the IP phone 621-*i* is displayed in a display component of the AR device 600. The AR device 600 recognizes the brand label, possibly with the assistance of a server or service in a connected network, and transmits a message 623 to the customer instance 322 in the remote management platform 320. The message includes the image and context information, which, by way of example, specifies "device." The customer instance 322 may use the context information to determine the appropriate processing of the image data. For instance, the specification of "device" may cause the processing to look up KB information for the identified IP phone. The customer instance 322 then responds with a message 625 containing the KB information for the device, which the AR device 600 displays in a virtual image 625-*v*. In the example illustrated, the KB information includes a model number, a relate knowledge base article identifier and title, and a selectable link to access the article. Again, no manual data entry needs to be involved to obtain this information.

The above use case examples do not cover all possible applications of AR-based assistance in network management. Other use cases are possible, including variations of those discussed. For example, integrated knowledge base search can be expanded to include display of a virtual image of a device and/or device component superimposed on a real image of the device, where the virtual image serves to confirm proper identification of a component to the user of the AR device. At the same time, the KB search can be used to display explanatory information or instructions (or links thereto) related to diagnosis and/or repair of the component, for example.

Other dynamic interactions between a user (e.g., technician) of an AR device and virtual images representing data, information, and/or links are possible as well. Detection and image capture of real objects can generally serve to initiate data capture, object recognition, and communication with the remote network management platform for access to relevant management data and transactions with relevant management operations. Data and information supplied by the network management platform can be processed by the AR device in order to generate and display relevant virtual objects superimposed on the AR device display.

While the operations described above by way of example emphasize the AR device, various aspects of the example embodiments are implemented on the remote management platform or other network-side servers. In accordance with example embodiments, a remote network management platform, including one or more processors and memory for storing instructions, may receive messages transmitted from an AR device via the managed network. The message may include information designating an object recognized in a real-time FOV captured by an imaging component of the AR device. The message may also include context information relating to the recognized object.

Based on the context information, the remote management platform could then select a category of managed objects. For example, if the context indicates that the object is a person, the selected category could be "customers." As another non-limiting example, if the context indicated that the object was a network device, the selected category could be "managed devices." The remote management platform may then associate the recognized object in a database of the selected category, and retrieve management information relating to the particular recognized object. The retrieved information may then be transmitted in a message form the remote management platform to AR device, which could then process and display the information as a virtual object, as described above.

VI. EXAMPLE OPERATIONS

Figure 7:
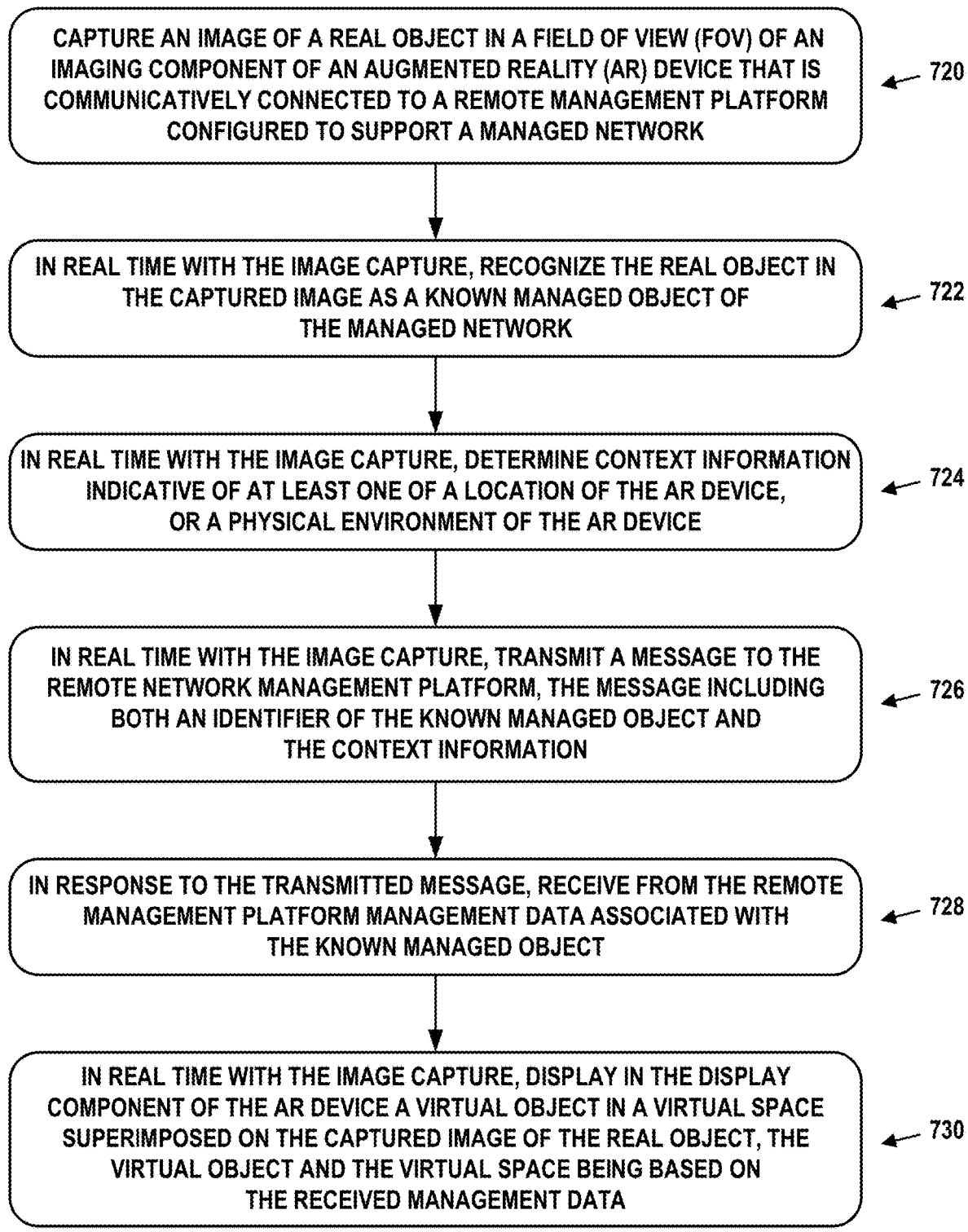
FIG. 7 is a flow chart of an example method of augmented reality assistance in a remote network management architecture, in accordance with example embodiments.
Figure 8:
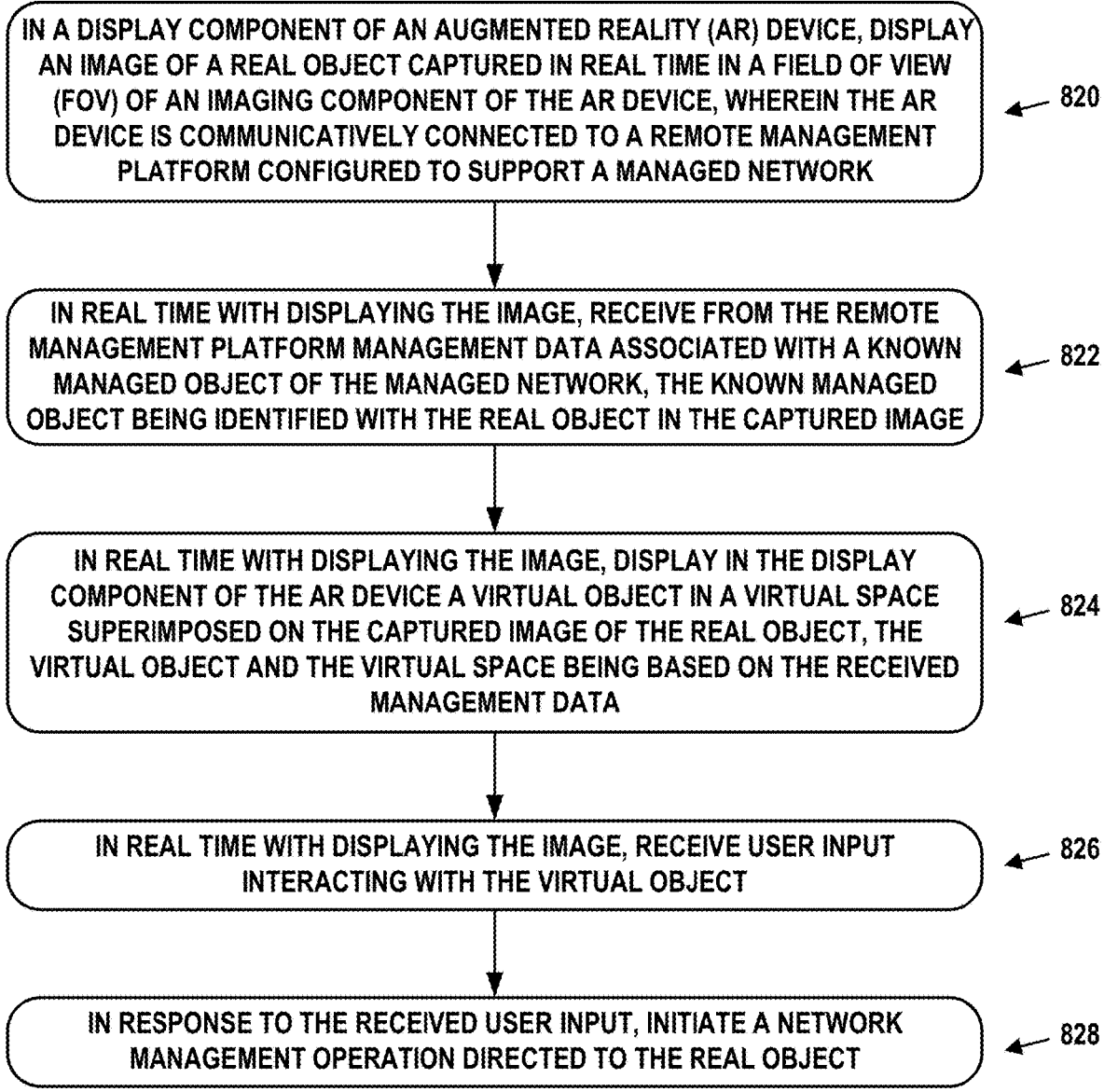
FIG. 8 is a flow chart of another example method of augmented reality assistance in a remote network management architecture, in accordance with example embodiments.

FIGS. 7 and 8 are flow charts illustrating example embodiments. The process illustrated by each of FIG. 7 and FIG. 8 may be carried out by an AR device that is communicatively connected to a connected to a remote network management platform, such as remote network management platform 320, configured to support a managed network, such as managed network 300. The AR devices described above are non-limiting examples of an AR device that could be used in the example methods illustrated in FIGS. 7 and 8.

The embodiments of FIGS. 7 and/or 8 may be simplified by the removal of any one or more of the features shown therein. Further, these embodiments may be combined with features, aspects, and/or implementations of any of the previous figures or otherwise described herein.

FIG. 7 illustrates an example method primarily for input of data and information.

At step 720, an imaging component of the AR device captures an image of a real object in a field of view (FOV) of the AR device.

At step 722, the real object in the captured image is recognized as a known managed object of the managed network. The recognition is made in real-time with capture of the image, and could be carried out by the AR device alone or in communication with a server or service in a connected network that processes the image data as provided by the AR device.

At step 724, context information is determined. The context information may be indicative of a location of the AR device, a physical environment of the AR device, or both. The determination is also made in real-time with capture of the image.

At step 726, a message is transmitted to the remote network management platform. The message includes both an identifier of the known managed object and the context information, and is transmitted in real time capture of the image.

At step 728, a response from the remote management platform management is received. The response includes data associated with the known managed object.

Finally, at step 730, a virtual object in a virtual space is displayed in the display component of the AR device, superimposed on the captured image of the real object. The virtual object and the virtual space are based on the received management data, and are displayed in real time with capture of the image of the real object.

In accordance with example embodiments, the real object may be a person and the known managed object may be a particular customer of the managed network. In this case, recognizing the real object in the captured image as the known managed object of the managed network may entail applying a facial recognition operation to the captured image to recognize the person to be the particular customer of the managed network.

Also in accordance with example embodiments, the context information may include an identification of a customer service interaction, or other customer-related interaction, that is occurring concurrently with capturing the image. For example, a CSM support technician using the AR device might be helping a customer at a walk-up help desk. In this case, transmitting the message to the remote network management platform may entail transmitting an identity of the particular customer and a request for customer management information associated with the particular customer, the selection being made according to the identified customer service interaction. Further, the management data associated with the known managed object may then be customer management information associated with the particular customer, and displaying the virtual object may entail displaying a virtual rendering of the customer management information superimposed in the FOV while concurrently displaying the image of the person.

In further accordance with example embodiments, the customer management information could include a customer profile and information indicating a status of one or more customer service issues associated with the particular customer.

In accordance with example embodiments, the real object may be a network device and the known managed object may be a particular managed device of the managed network. In this case, recognizing the real object in the captured image as the known managed object of the managed network may entail recognizing an asset identifier on the network device as identifying the particular managed device of the managed network.

Also in accordance with example embodiments, the context information may include an identification of a network device field-service operation that is occurring concurrently with capturing the image. For example, an IT support technician using the AR device might be diagnosing a network issue in the field. In this case, transmitting the message to the remote network management platform may entail transmitting an identity of the particular managed device and a request for device management information associated with the particular managed device, the selection being made according to the identified network device field-service operation. Further, the management data associated with the known managed object may then be device management information associated with the particular managed device, and displaying the virtual object may entail displaying a virtual rendering of the device management information together with a virtual graphical representation of a location of the particular managed device in the managed network superimposed in the FOV while concurrently displaying the image of the network device.

In further accordance with example embodiments, the device management information could include information indicating a status of one or more other devices communicatively connected to the particular managed device.

Also in accordance with example embodiment, the method illustrated in FIG. 8 could further include receiving a voice prompt at an audio input component of the AR device, and in response to the voice prompt, activating an interface for inputting data to a network management query to the remote network management platform.

FIG. 8 illustrates an example method primarily for output of data and information, and interaction with the outputted data and information.

At step 820, an image of a real object captured in real time in a field of view (FOV) of an imaging component of the AR device is displayed in a display component of the AR device.

At step 822, management data associated with a known managed object of the managed network is received from the remote management platform. In particular, the managed object is one that is identified with the real object in the captured image. The management data are received in real time with display of the image.

At step 824, a virtual object in a virtual space is superimposed on the captured image of the real object in the display component of the AR device. The virtual object and the virtual space are based on the received management data, and are superimposed on the display in real time with display of the image of the real object.

At step 826, user input interacting with the virtual object is received in real time with display of the image of the real object.

Finally, at step 828, a network management operation directed to the real object is initiated in response to the received user input.

In accordance with example embodiments displaying the virtual object in the virtual space superimposed on the captured image of the real object, the virtual object and the virtual space being based on the received management data, displaying a virtual rendering of the received management data information superimposed in the FOV while concurrently displaying the captured image of the real object.

In accordance with example embodiments, receiving the user input interacting with the virtual object may entail detecting a user interaction with the virtual rendering of the received management data information. In example operation, the detected user interaction could be a voice command including a spoken reference to displayed content of the received management data information, or a hand gesture including virtual manipulation of displayed content of the received management data information. Further, initiating a network management operation directed to the real object could entail inputting the displayed content to the data network management operation.

In accordance with example embodiments, the real object may be a person and the known managed object may be a particular customer of the managed network. Further, the management data associated with the known managed object may be customer management information associated with the particular customer. In this case, displaying the virtual object in the virtual space may entail displaying a virtual rendering of a customer profile and information indicating a status of one or more customer service issues associated with the particular customer superimposed in the FOV while concurrently displaying the image of the person.

In further accordance with example embodiments, the customer management information could include a customer profile and information indicating a status of one or more customer service issues associated with the particular customer. In this case, receiving the user input interacting with the virtual object may entail receiving a voice command including a spoken reference to displayed content of the virtual rendering of the customer management information. In addition, initiating a network management operation directed to the real object may entail inputting the displayed content to a customer management operation.

In accordance with example embodiments, the real object may be a network device and the known managed object may be a particular managed device of the managed network. Further, the management data associated with the known managed object may be device management information associated with the particular managed device. In this case, displaying the virtual object in the virtual space may entail displaying a virtual rendering of the device status information together with a virtual graphical representation of a location of the particular managed device in the managed network superimposed in the FOV while concurrently displaying the image of the network device.

In further accordance with example embodiments, the virtual graphical representation of a location of the particular managed device in the managed network could include a graphical network map indicating locations and communicative interconnections of the particular managed device and one or more other devices of the managed network. In this case, receiving the user input interacting with the virtual object may entail detecting a hand gesture selecting one or more of the particular managed device and the other devices of the managed network. In addition, initiating a network management operation directed to the real object may entail displaying status information of the selected devices, superimposed in the FOV.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method carried out by an augmented reality (AR) device communicatively connected to a remote network management platform configured to support a managed network, the method comprising:

capturing an image of a real object in a field of view (FOV) of an imaging component of the AR device;

in real time with capturing the image, recognizing the real object in the captured image as a known managed object of the managed network;

in real time with capturing the image, determining context information indicative of at least one of a location of the AR device, or a physical environment of the AR device;

in real time with capturing the image, transmitting a message to the remote network management platform, the message including both an identifier of the known managed object and the context information;

in response to the transmitted message, receiving, from the remote network management platform, management data associated with the known managed object; and in real time with capturing the image, displaying in a display component of the AR device a virtual object in a virtual space superimposed on the captured image of the real object, the virtual object and the virtual space being based on the received management data.

2. The method of claim 1, wherein the real object is a person and the known managed object is a particular customer of the managed network, and wherein recognizing the real object in the captured image as the known managed object of the managed network comprises applying a facial recognition operation to the captured image to recognize the person to be the particular customer of the managed network.

3. The method of claim 2, wherein the context information comprises an identification of a customer service interaction that is concurrent with capturing the image, and wherein transmitting the message to the remote network management platform, the message including both an identifier of the known managed object and the context information, comprises transmitting to the remote network management platform an identity of the particular customer and a request for customer management information associated with the particular customer and selected according to the identified customer service interaction.

4. The method of claim 2, wherein the management data associated with the known managed object is customer management information associated with the particular customer, and wherein displaying the virtual object in the virtual space superimposed on the captured image of the real object, the virtual object and the virtual space being based on the received management data, comprises:

displaying a virtual rendering of the customer management information superimposed in the FOV while concurrently displaying the image of the person.

5. The method of claim 4, wherein the customer management information comprises a customer profile and information indicating a status of one or more customer service issues associated with the particular customer.

6. The method of claim 1, wherein the real object is a network device and the known managed object is a particular managed device of the managed network, and wherein recognizing the real object in the captured image as the known managed object of the managed network comprises recognizing an asset identifier on the network device as identifying the particular managed device of the managed network.

7. The method of claim 6, wherein the context information comprises an identification of a network device field-service operation that is concurrent with capturing the image, and wherein transmitting the message to the remote network management platform, the message including both an identifier of the known managed object and the context information, comprises transmitting to the remote network management platform an identity of the particular managed device and a request for device management information associated with the particular managed device and selected according to the identified network device field-service operation.

8. The method of claim 6, wherein the management data associated with the known managed object is device management information associated with the particular managed device, and wherein displaying the virtual object in the virtual space superimposed on the captured image of the real object, the virtual object and the virtual space being based on the received management data, comprises:

displaying a virtual rendering of the device management information together with a virtual graphical representation of a location of the particular managed device in the managed network superimposed in the FOV while concurrently displaying the image of the network device.

9. The method of claim 8, wherein the device management information comprises information indicating a status of one or more other devices communicatively connected to the particular managed device.

10. The method of claim 1, further comprising:

receiving a voice prompt at an audio input component of the AR device, in response to the voice prompt, activating an interface for inputting data to a network management query to the remote network management platform.

11. A non-transitory, tangible, and computer-readable medium comprising instructions configured to cause one or more hardware processors to perform operations including:

capturing an image of a real object in a field of view (FOV) of an imaging component of an augmented reality (AR) device;

in real time with capturing the image, recognizing the real object in the captured image as a known managed object of a managed network;

in real time with capturing the image, determining context information indicative of at least one of a location of the AR device, or a physical environment of the AR device;

in real time with capturing the image, transmitting a message to a remote network management platform configured to support the manage network, the message including both an identifier of the known managed object and the context information;

in response to the transmitted message, receiving, from the remote network management platform, management data associated with the known managed object; and in real time with capturing the image, displaying in a display component of the AR device a virtual object in a virtual space superimposed on the captured image of the real object, the virtual object and the virtual space being based on the received management data.

12. The computer-readable medium of claim 11, wherein the real object is a person and the known managed object is a particular customer of the managed network, and wherein recognizing the real object in the captured image as the known managed object of the managed network comprises applying a facial recognition operation to the captured image to recognize the person to be the particular customer of the managed network.

13. The computer-readable medium of claim 12, wherein the context information comprises an identification of a customer service interaction that is concurrent with capturing the image, and wherein transmitting the message to the remote network management platform, the message including both an identifier of the known managed object and the context information, comprises transmitting to the remote network management platform an identity of the particular customer and a request for customer management information associated with the particular customer and selected according to the identified customer service interaction.

14. The computer-readable medium of claim 12, wherein the management data associated with the known managed object is customer management information associated with the particular customer, and wherein displaying the virtual object in the virtual space superimposed on the captured image of the real object, the virtual object and the virtual space being based on the received management data, comprises:

displaying a virtual rendering of the customer management information superimposed in the FOV while concurrently displaying the image of the person.

15. The computer-readable medium of claim 14, wherein the customer management information comprises a customer profile and information indicating a status of one or more customer service issues associated with the particular customer.

16. The computer-readable medium of claim 11, wherein the real object is a network device and the known managed object is a particular managed device of the managed network, and wherein recognizing the real object in the captured image as the known managed object of the managed network comprises recognizing an asset identifier on the network device as identifying the particular managed device of the managed network.

17. A computing system of an augmented reality (AR) device, the computing system comprising:

one or more processors; and a memory storing program instructions that, upon execution by the one or more processors, cause the one or more processors to perform operations comprising:

capturing an image of a real object in a field of view (FOV) of an imaging component of an augmented reality (AR) device;

in real time with capturing the image, recognizing the real object in the captured image as a known managed object of a managed network;

in real time with capturing the image, determining context information indicative of at least one of a location of the AR device, or a physical environment of the AR device;

in real time with capturing the image, transmitting a message to a remote network management platform configured to support the manage network, the message including both an identifier of the known managed object and the context information;

in response to the transmitted message, receiving, from the remote network management platform, management data associated with the known managed object; and in real time with capturing the image, displaying in a display component of the AR device a virtual object in a virtual space superimposed on the captured image of the real object, the virtual object and the virtual space being based on the received management data.

18. The computing system of claim 17, wherein the real object is a person and the known managed object is a particular customer of the managed network, and wherein recognizing the real object in the captured image as the known managed object of the managed network comprises applying a facial recognition operation to the captured image to recognize the person to be the particular customer of the managed network.

19. The computing system of claim 18, wherein the context information comprises an identification of a customer service interaction that is concurrent with capturing the image, and wherein transmitting the message to the remote network management platform, the message including both an identifier of the known managed object and the context information, comprises transmitting to the remote network management platform an identity of the particular customer and a request for customer management information associated with the particular customer and selected according to the identified customer service interaction.

20. The computing system of claim 18, wherein the management data associated with the known managed object is customer management information associated with the particular customer, and wherein displaying the virtual object in the virtual space superimposed on the captured image of the real object, the virtual object and the virtual space being based on the received management data, comprises:

displaying a virtual rendering of the customer management information superimposed in the FOV while concurrently displaying the image of the person.

* * * * *